Patented Mar. 27, 1923.

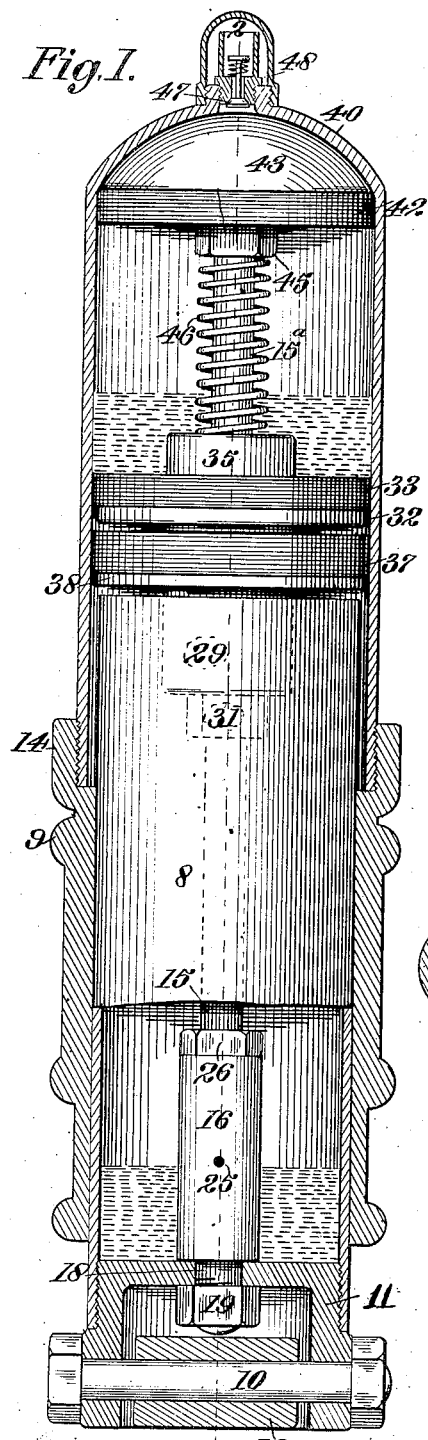
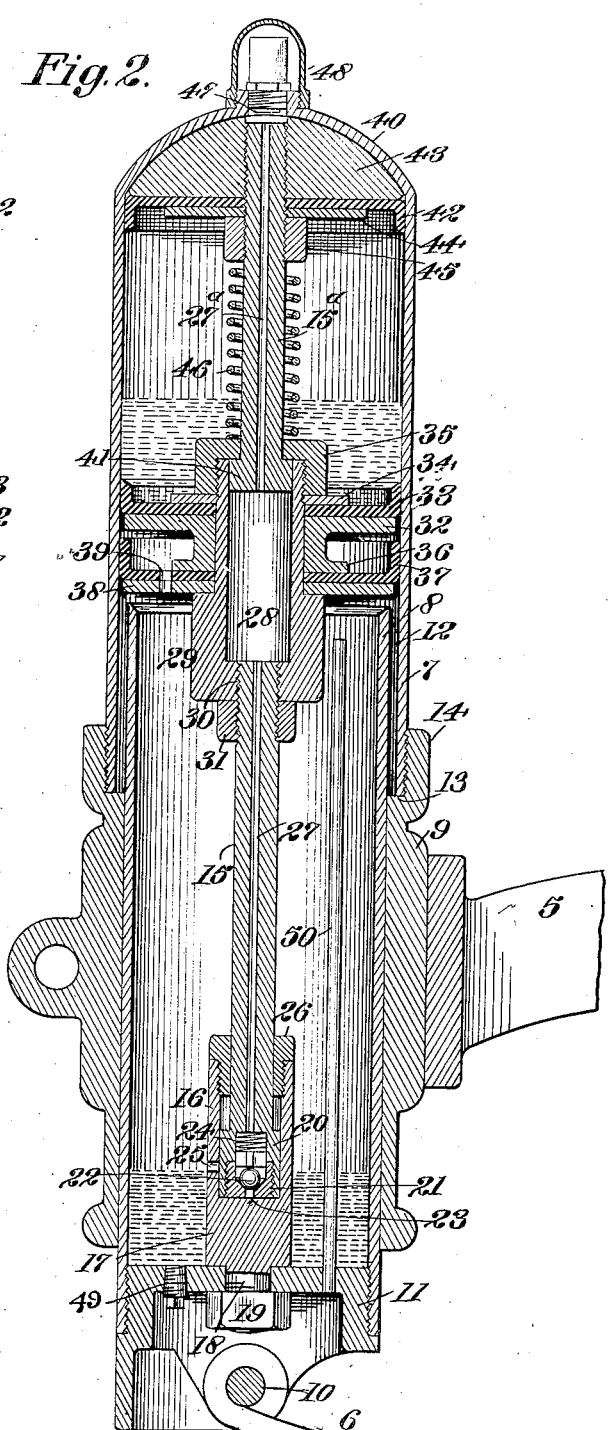

1,450,144

UNITED STATES PATENT OFFICE.

FRANK A. DOWLER, OF ALAMEDA, CALIFORNIA.

SHOCK ABSORBER.

Application filed July 16, 1920. Serial No. 396,660.

*To all whom it may concern:*

Be it known that I, FRANK A. DOWLER, a citizen of the United States, and a resident of the city of Alameda, in the county of Alameda and State of California, have invented certain new and useful Improvements in Shock Absorbers, of which the following is a specification.

The present invention relates to shock absorbers, and has reference more particularly to a device which is adapted to be associated with the spring structure of vehicles especially automobiles and the like for absorbing and diminishing shocks and vibrations incident to irregularities in the road surface over which the vehicle traverses.

The primary object of the invention is to provide a shock absorber in which air is employed as a cushioning or absorbing medium without the difficulties usually experienced with these types of devices.

The preferred form of the invention is illustrated in the accompanying drawing in which Fig. 1 is a side elevation showing the cylinders in section and Fig. 2 is a vertical section on the line 2—2 Fig. 1.

Referring now to the drawing in detail 5 and 6 represent the opposed parts of a conventional vehicle spring structure as ordinarily employed on the front of a motor vehicle. The elements of the spring structure as used on the rear of the vehicle are slightly modified to meet the requirements at that location but the present invention may be adapted in either capacity in so far as concerns its salient features; therefore, using the front spring structure as an illustration the device primarily consists of a pair of telescoping cylinders 7 and 8 mounted to the parts 5 and 6 respectively through the sleeve bracket 9 and the link connection 10. The cylinder 8 is closed at its lower end by a plug 11 which carries the pintle of the link connection 10. This cylinder, further, extends through the sleeve bracket 9 and has a snug fit therein, although the same is free to slide relative thereto. The diameter of the cylinder 8 is smaller than that of the cylinder 7 and the upper end of the cylinder 8 is adapted to be received in the cylinder 7 with a space 12 left between the 2 cylinders which is closed at the bottom by the annular shoulder 13 on the sleeve bracket 9. This shoulder together with the extension 14 of the sleeve bracket which is threaded on its inside is adapted to receive the threaded lower end of the cylinder, 7.

Supported by and fixed to the plug 11 is a piston rod 15 which extends vertically through the shoulders and is constructed in sections, the lowermost of which representing a tubular shaped part 16 having a solid portion 17, terminating in a reduced end 18 made to be received by an axial opening in the plug 11 and threaded to receive the nut 19 for fixedly connecting the same to the plug. The inside of the tubular shaped part 16 is bored out to provide a housing for the enlarged end 20 of the piston rod 15 which is also recessed and provided with a threaded bracket 21, for confining the ball valve 22 which is adapted to close the opening 23 under the influence of the spring 24 with the enlarged end 20 of the piston rod normally closing the opening 25 in the side of the tubular shaped part 16.

It is to be noted that the bored out portion of the tube 16 is of a length greater than the height of the enlarged end 20 to give the enlarged end 20 a length of movement sufficient to enable a communication to be established between the opening 25 and the opening 23 when the piston rod has been moved upwardly as will be hereinafter described. A suitable threaded plug 26 having an axial movement through which the piston rod 15 extends is adapted to close the top of the tube 16. The piston rod 15 is constructed with an axial bore 27 communicating at its lower end with the housing for the ball valve 22 and at its upper end with the chamber 28 formed by the housing 29 with which the piston rod has a threaded engagement as at 30 with a lock 31 adapted to effect a more or less permanent connection. The housing 29 is preferably cylindrical in shape and constructed with a reduced upper portion for mounting a piston 32 which embodies in its construction an upwardly turned cup leather 33 with a washer 34 overlying the cup leather and with the cap 35 threaded to the reduced end of the housing 29, and bearing upon the washer 34 for rigidity, clamping the cup leather 33 between the washer and the disc shaped part of the piston which terminates in a lower annular flange 36 for confining the cup leather 37 of a second piston between it and a disc 38. While in reality the structure just described represents two pistons, the relationship of the parts which go to make up the same are such that the two pistons are constructed of practically the same parts. An exteriorly arranged opening 39 is provided in the lower piston the purpose of which will be hereinafter described. The cap 35 is provided with an opening through which the section 15ª of the piston rod extends, the said section being also provided with an axial bore 27ª, which communicates at one end with the chamber 28 and with its opposite end terminating adjacent the dome shaped top 40 of the cylinder 7. The lower end 41 of the section 15ª has a diameter of substantially that of the chamber 28 and is confined therein free to slide vertically thereof. Carried on the upper end of the section 15ª is a piston which embodies in its construction a downwardly turned cup leather 42 which is confined between the dome shaped block 43 and a disc 44 with a lock nut 45 engaging the threads of the section as shown. The dome shaped block 43 is also provided with a threaded opening through which the section 15ª of the piston rod passes. A coil spring 46 surrounds the section 15ª of the piston rod and acts to space the pistons apart to provide an air chamber between their opposed portions with a valved inlet 47 having a cap closure 48 arranged in the dome shaped top 40 of the cylinder 7 for introducing air under pressure past the upper piston and into the said air chamber where it is stored so it may also act to normally influence the spacing apart of the pistons. This air chamber will also contain a quantity of oil, as shown, with a second oil supply provided in the lowermost part of the cylinder 8. The level of the oil at this location should be about at the opening 25. The oil supply for the cylinder 8 may be introduced through the plugged opening 49. A suitable breather tube 50 may extend vertically of the cylinder 8 and terminating with the communication exteriorly thereof to relieve this cylinder of any air pressure.

With the device constructed as above, any jolt or jar imposed on the spring structure would be transmitted to the piston 32 to cause the same to move upwardly with the air stored in the chamber between it and the top piston, acting to resist such upward movement of the said piston and thus produce a cushioning or shock absorbing effect. On an abnormal rebound of the part 6 of the spring structure which would tend to pull the piston 32 downwardly and by it the top piston, a suction or vacuum would be created in the dome shaped top 40 which would check or resist the downward movement of the piston. It is of course understood that the vacuum created in the dome shaped top 40 and the suction likewise produced in the bore 27 will not be strong enough, or at least, the spring 24 of the ball valve will have sufficient influence over the ball to maintain the same closed against any suction which may be in the bore 27. It is to be further noted that when an abnormal rebound is imposed on the part 6 of the spring structure which would pull the piston 32 and the piston 43 downwardly, the housing 20 for the ball valve would be moved upwardly which would leave a space at the lower part of the housing and establish a communication through the opening 25 with the oil supply. Should the oil supply at this time be above the opening 25 or even with it, a quantity of oil will be admitted into the space below the valve housing, and upon the ball housing resuming its normal position, it will act in the capacity of a piston which will force any oil past the ball valve against the resistance of the spring 24, where it will occupy the bore 27. If the quantity of oil thus introduced into the bore 27 is sufficient, it will be forced into the space 28, and eventually by the action of the part 41, it will be forced upwardly through the bore 27ª and over the top of the piston 43, and lubricate the cup leather 42. Should the oil supply be lower than the opening 25 and air should occupy the space left by the upward movement of the ball housing 20 this air will not be introduced into the bore 27 as the fit of the valve housing 20 in its housing will not be tight enough to cause the air to overcome the resistance of the spring 24, but instead the air will escape from around the sides of the valve housing and into the cylinder 8 where it will be relieved through the breather tube 50. As heretofore stated, the breather tube 50 will act to maintain the pressure within the cylinder 8 at about atmosphere.

It is to be noted that the periphery of the cylinder 8 will act as a stop to limit the downward movement of the piston 32.

Should any oil contained in the air chamber between the opposed pistons leak past the cup leather 33, it would be collected by the cup leather 37 of the lower piston from which point it would pass through the opening 39 and be collected with the oil supply in the bottom of the cylinder, 8.

I claim:

1. In a shock absorber, a cylinder, a piston rod extending within the cylinder with one end adapted to be connected with one part of a vehicle spring structure, and with the cylinder connected to another part of the spring, said rod comprising a fixed section and a section adapted to slide axially thereof, and independently of the sliding movement of the fixed section, a piston on the fixed section and a piston on the independently sliding section, said pistons being spaced apart to form an air chamber in the cylinder, means for introducing and maintaining a head of air in said chamber to produce a cushioning effect between the pistons when the parts of the spring structure slide them toward each other, the piston on the independently sliding section of the rod adapted to produce a vacuum in the space left by it in the top of the cylinder.

2. In a shock absorber, a cylinder, a piston rod extending within the cylinder with one end adapted to be connected with one part of a vehicle spring structure, and with the cylinder connected to another part of the spring, said rod comprising a fixed section and a section adapted to slide axially thereof, and independently of the sliding movement of the fixed section, a piston on the fixed section and a piston on the independently sliding section, said pistons being spaced apart to form an air chamber in the cylinder, means for introducing and maintaining a head of air in said chamber to produce a cushioning effect between the pistons when the parts of the spring structure slide them toward each other, the piston on the independently sliding section of the rod adapted to produce a vacuum in the space left by it in the top of the cylinder.

3. In a shock absorber, a pair of telescoping cylinders each cylinder adapted to be connected to an opposite part of a vehicle spring structure, a pair of opposed pistons in one of the cylinders, a mounting for said pistons extending through the cylinders and fixedly connected to one of the cylinders, said mounting having a section capable of an axial sliding movement relative to its other part and carrying one of the pistons whereby both pistons are capable of moving away from and toward each other; the space between the pistons comprising an air space with means for introducing and maintaining a head of air therein, one of the pistons in moving downwardly of the cylinder adapted to produce a vacuum in the top of the cylinder, and the mounting for the pistons having a bore communicating through a valved part of one end with a source of oil supply and at its opposite end with the top of the cylinder.

4. A shock absorber comprising upper and lower telescoping cylinders, the upper cylinder having a mounting on one element of a vehicle spring structure and the lower cylinder having a mounting on another element of said spring structure, a piston rod constructed in connected sections with one end fixed to the lower cylinder and with its opposite end terminating in the top of the upper cylinder, the bottom cylinder adapted to contain an oil supply, a bore extending the length of the piston rod having a valved communication with said oil supply, one section of the piston rod adapted to slide axially of the other part without interrupting the passage established by said bore, a piston fixed to the axially sliding section of the piston rod adapted to normally occupy a position in the top of the upper cylinder, a second piston fixed to the other part of the piston rod and spaced from said first named piston under the influence of a spring tension device, the space between the pistons constituting an air chamber, means for introducing and maintaining a head of air in said chamber to assist said spring tension device in opposing a movement of the pistons toward each other, said first named piston adapted to produce a vacuum in the top of the cylinder when the same slides downwardly thereof whereby the vacuum thus produced will operate to check the downward movement of said piston.

5. A shock absorber as set forth in claim 4 and in which the upper cylinder has a dome shaped top with a valved air opening therein for introducing a head of air in the air chamber, and in which the first named piston also has a dome shaped top adapted to conform to and occupy the entire space in the top of said cylinder when in normal position.

6. A shock absorber, including a pair of telescoping cylinders, a pair of opposed pistons in said cylinders with an air cushion maintained therebetween, said air cushion adapted to resist a movement of the pistons toward each other, said top piston adapted to create a vacuum in the top of its confining cylinder to resist the downward movement of the top piston.

FRANK A. DOWLER.